UNITED STATES PATENT OFFICE.

CARL TUNSTILL JOHN OPPERMANN, OF LONDON, ENGLAND.

COMPOSITION FOR USE IN SECONDARY BATTERIES.

SPECIFICATION forming part of Letters Patent No. 706,444, dated August 5, 1902.

Application filed January 11, 1902. Serial No. 89,323. (No specimens.)

*To all whom it may concern:*

Be it known that I, CARL TUNSTILL JOHN OPPERMANN, electrical engineer, a subject of the King of Great Britain, residing at 2 Wynyatt street, Clerkenwell, London, E. C., England, have invented new and useful Improvements in Compositions for Secondary Batteries, of which the following is a specification.

My improvements in secondary batteries have for object to increase the efficiency and durability of the battery by rendering the active material harder and less liable to disintegration and insuring more complete and more uniform chemical action, so as to avoid buckling of the plates.

In order to render the active material harder and more coherent, I make up the lead oxid into paste with dilute sulfuric acid, to which is added a small proportion of a binding or cementing substance insoluble in sulfuric acid. The substance which I employ for the purpose is bitumen (preferably Trinidad bitumen) dissolved in a light hydrocarbon, preferably benzene, the solution of bitumen in benzene being diluted with alcohol in order to render it miscible with the dilute sulfuric acid. The proportions which I find answer well in practice, but to which I in no way limit myself, are as follows: I dissolve one ounce bitumen in ten ounces (one-half pint) of benzene, and this solution I dilute with forty ounces (one quart) of alcohol (methylated spirit) and add this diluted solution to sufficient dilute sulfuric acid (of about specific gravity 1.170) to make with one hundred pounds lead oxid a paste of the required consistency; or the sulfuric-acid solution may be omitted, in which case one hundred ounces of the dilute bitumen solution would be required for one hundred pounds of lead oxid; or the alcohol may be omitted from the bitumen solution, in which case one hundred ounces of solution of bitumen in benzene alone would be added to one hundred pounds lead oxid to form a dry mass, to which sufficient dilute sulfuric acid would then be added to form an easily-workable paste.

After applying the above-described paste to the support it is dried thoroughly at a low temperature, whereby to evaporate the solvent of the bitumen, and so cause the latter to cement together the particles of the active material.

The cementing action produced by the above-mentioned proportion of bitumen gives such a degree of hardness to the active material as to greatly increase its durability without materially affecting its ampere-hour capacity; but it is to be understood that if the proportion of bitumen be materially increased the hardness and durability will be so much the greater, but the ampere-hour capacity will be proportionately less.

The plates are "formed" in the ordinary way. In constructing the battery I prefer to use the grid form of supporting-frame; but I make the mass of active material contained in the cells of the grid of so much less thickness than usual that it undergoes chemical action throughout almost its entire mass, the chemical action being rendered so complete and so uniform that buckling of the plates is almost entirely avoided and the percentage of useful active material is largely increased.

I claim—

1. In a secondary battery, the combination with the lead oxid constituting the active material, of bitumen in solution, whereby to render the active material harder and more coherent.

2. In the preparation of the active material for the plates of a secondary battery, the combination with lead oxid, of bitumen in solution in a light hydrocarbon.

3. In the preparation of the active material for the plates of a secondary battery, the combination with lead oxid, of bitumen in solution in benzene with the addition of alcohol.

4. In the preparation of the active material for the plates of a secondary battery, the combination with the lead oxid, of bitumen in solution in a light hydrocarbon and of dilute sulfuric acid.

5. A battery composition, consisting of active material admixed with a solution of bitumen in a solvent thereof and with dilute sulfuric acid.

6. A battery composition consisting of active material admixed with a solution of bitumen in a hydrocarbon liquid and with dilute sulfuric acid in quantities sufficient to form a paste.

7. A battery composition consisting of oxid of lead admixed with a solution of bitumen in a hydrocarbon liquid and with a sufficient quantity of dilute sulfuric acid to form a paste.

CARL TUNSTILL JOHN OPPERMANN.

Witnesses:
THOMAS W. KENNARD,
CAMPBELL G. CLARK.